Dec. 21, 1937.  F. M. YOUNG  2,103,104
AIR CONDITIONER FOR VEHICLE BODIES
Filed Aug. 21, 1933  4 Sheets-Sheet 2

INVENTOR
Fred M. Young
BY A. S. Kroh
ATTORNEY

Dec. 21, 1937.  F. M. YOUNG  2,103,104
AIR CONDITIONER FOR VEHICLE BODIES
Filed Aug. 21, 1933    4 Sheets-Sheet 3

INVENTOR
Fred M Young
BY A S Kroh
ATTORNEY

Dec. 21, 1937.  F. M. YOUNG  2,103,104
AIR CONDITIONER FOR VEHICLE BODIES
Filed Aug. 21, 1933  4 Sheets-Sheet 4

INVENTOR
Ford M. Young
BY A Skroh
ATTORNEY

Patented Dec. 21, 1937

2,103,104

UNITED STATES PATENT OFFICE 2,103,104

AIR CONDITIONER FOR VEHICLE BODIES

Fred M. Young, Racine, Wis., assignor to Young Radiator Company, Racine, Wis.

Application August 21, 1933, Serial No. 686,025

10 Claims. (Cl. 62—117)

My invention relates to an air conditioner for use on ambulances, busses, railroad coaches and the like, and has for its object, supplying simple inexpensive means for air conditioning vehicles of the class, without using any of the ordinarily provided space for passengers or operator.

The term air conditioning is used by applicant in its broadest sense as understood by those familiar with the art.

When a vehicle is equipped with my invention the air may be cooled by refrigeration or warmed by operating the refrigerator on a reversed cycle, or warmed by passing the air through a radiator core through the tubes of which the cooling liquid from the engine jacket is circulated, or the air otherwise conditioned or heated to suit the requirements in a vehicle of this type.

One of the novel features of my invention is the position of the apparatus and manner of supplying power thereto.

Another novel feature is the manner of conducting the conditioned air to the vehicle body and means for distributing it throughout the enclosure, whereby there are no perceptible drafts, thus to make the system desirable for passenger vehicles, coaches etc.

A further novel feature of my invention is the introduction of fresh air into the system, whereby the fresh air mingles with the air in circulation and is conditioned before passing into the vehicle enclosure.

To these and other useful ends my invention resides in features of construction, the parts and combinations thereof, and mode of operation or their equivalents, as hereinafter set forth and claimed and shown in the accompanying drawings in which:

Figure 1:
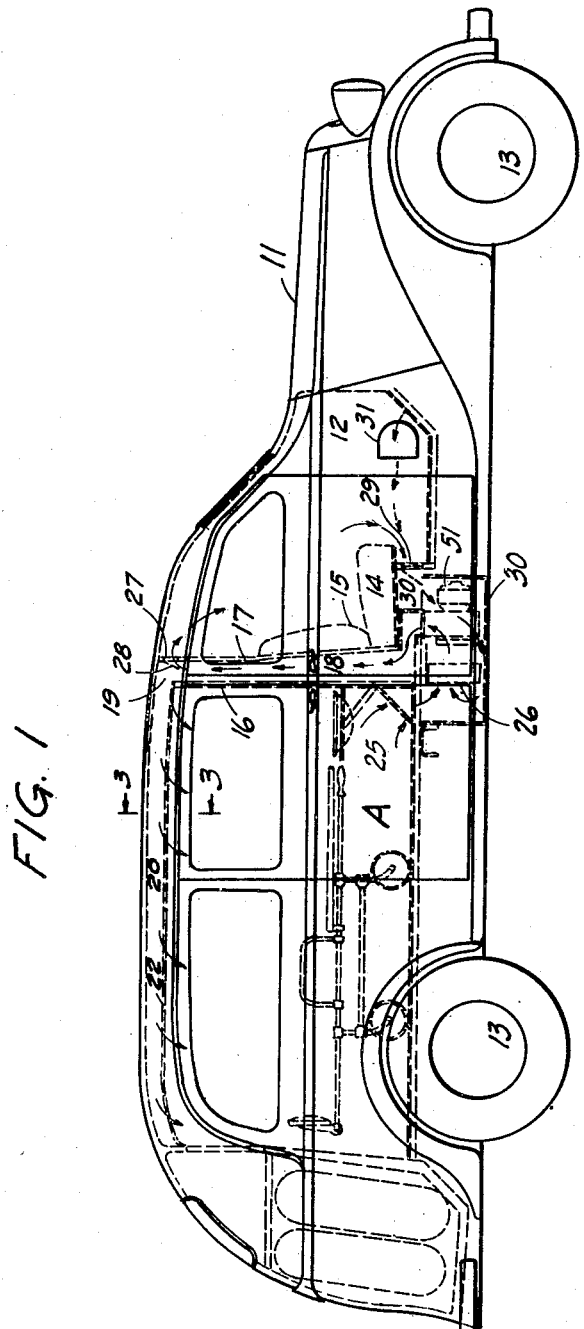
Figure 1 is a side elevation of an ambulance equipped with my invention.

I have shown in Figure 1, my air conditioner as installed in an ambulance. For busses and the like the general plan will preferably be very similar to that shown. However a railroad coach might require a differently positioned apparatus. I have shown my preferred form of air delivery to the body whether ambulance, buss or railroad coach.

Figure 2:
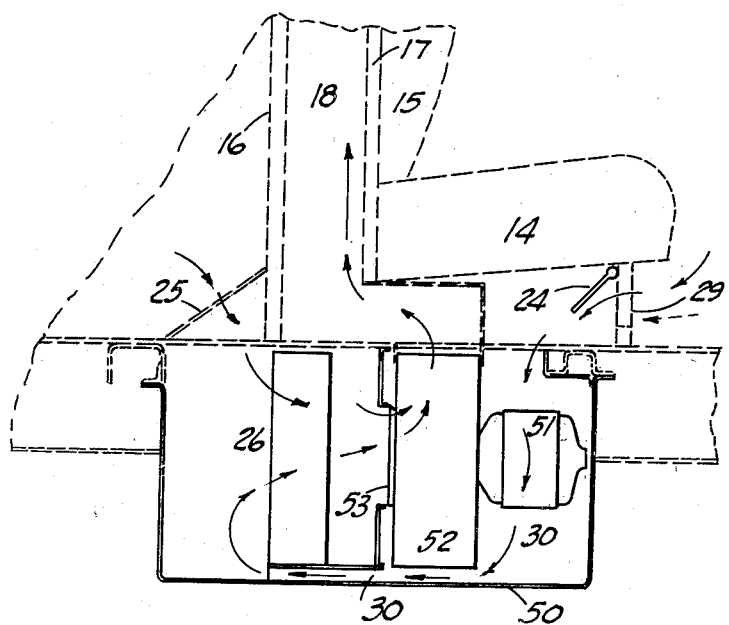
Figure 2 is a diagrammatic view showing the path of the air through the conditioning apparatus.
Figure 3:
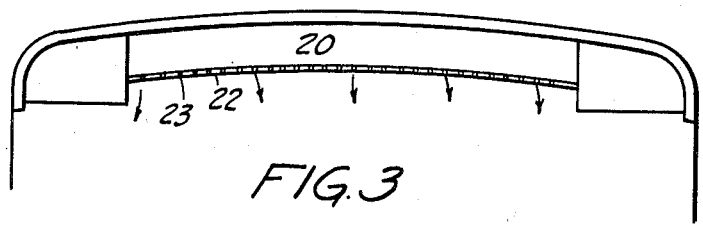
Figure 3 is a sectional view of the horizontal air duct taken on line 3—3 of Figure 1.

Referring now specifically to Figures 1, 2, and 3; the vehicle body of the ambulance in its entirety is designated by reference character A, the vehicle having a hood 11, cowl 12, carrying wheels 13, and a suitable power plant and controlling means, such as is standard on automobiles, busses and the like.

The driver's seat 14 is preferably positioned as indicated and having a back rest 15. A vertical partition 16 separates the body enclosure from the driver's compartment. A sheet metal member 17 is positioned a suitable distance from partition 16, and is adapted to provide an air duct 18. This air duct 18 need not be the full width of the partition 16, the principal object being to form an air duct of sufficient capacity to serve the purpose.

It will be understood that when my device is installed on a passenger vehicle that the entrance to the driver's compartment may also serve as the passenger entrance, in which case an opening must be provided in the partition wall 16, the driver's seat being made shorter accordingly. The principal desideratum being to provide a vertical air passage way in rear of the seat as a matter of room economy, appearance and to provide a convenient place for the air outlet from the body.

The passage way 18 terminates as at 19 and is operatively connected to air duct 20 which is preferably centrally positioned and is preferably built into the roof of the body, and provided with a cover wall 22. This cover wall 22 is preferably made from thin sheet metal and provided with a multiplicity of small closely spaced openings 23, whereby the conditioned air is directed downwardly through the small openings as indicated by arrows. This cover wall may be made from cane or ratan material, properly woven to provide small openings between the strips to thereby evenly distribute the air over the interior of the body.

In Figure 3, I show the duct 20 as of considerable width. In some installations it may be considerably narrower than indicated and while I show this duct as extending the full length of the body compartment it may be designed to cover only a portion of the length; furthermore while I have described the plate 22, as having a large number of closely spaced openings along its entire length, I may elect to provide these openings at the rear end only, the principal object being to distribute the conditioned air in a suitable manner, so as to avoid drafts. I may however under some conditions elect to discharge the conditioned air into the vehicle by means of spaced apart grilles, either in the ceiling or in the side wall thereof.

In the front lower corner of the body, I provide a grille 25, which has an air-way connection to the conditioning apparatus as at 26, thus providing a complete air circuit or path leading from the lower end of duct 18, upward to duct 20, thence rearwardly through duct 20 from whence the air passes through the openings 22 into the body enclosure and then it passes from the body through the grille 25 into the inlet of the apparatus as at 26 all of which is indicated in Figures 1 and 2, by arrows.

At the junction of the vertical duct 18 and horizontal duct 20 I provide an opening in member 17, as at 27 and a manually operated valve or damper 28 therefor, whereby any desired amount of air may be diverted forward into the operator's compartment.

Just below the operator's seat, an opening 29 is provided. This opening is preferably supplied with a grille and a damper 24, which is adapted to be manually adjusted for purposes which will be apparent. An air passage way 30, is provided, whereby the air which is diverted by damper 28 joins the main body of the circulating air and enters the apparatus therewith as at 26. The direction of this diverted air flow is clearly indicated by arrows in Figure 1. Thus the operator will sit in the path of the diverted air whereby he will at all times be made conscious of the condition of the circulating air; this feature is most desirable, when my invention is used on an ambulance.

In devices of this kind there are always certain leakages from the vehicle body. In order to supply a fresh quantity of conditioned air to the body I provide fresh air openings in opposite sides of the cowl 12 as at 31. These openings are supplied with the usual manually adjusted valve whereby the quantity of fresh air entering the system may be under the control of the operator. I supply an air filter (not shown) in the openings 31, from whence the air passes into the operator's compartment, joining the diverted air current as indicated by dotted line arrows.

Thus it will be observed that I have provided a complete conditioned air path through the body, a diverted air passage through the operator's compartment and a fresh air supply whereby the diverted air and fresh air pass through the conditioner before entering the vehicle body. This air may be cooled by refrigeration or warmed by refrigeration operating on a reverse cycle, or the air may be warmed by means of a radiator through which the cooling liquid of the engine passes as will hereinafter appear.

Thus far I have described fully my improved air circulating means without referring specifically to my air conditioning device which comprises two principal units designated in their entirety by reference characters B and C. Unit B comprises an enclosure 40, a speed controlling device 41, and a compressor 42 to which the speed governor 41 is directly connected as at 43.

Figure 5:
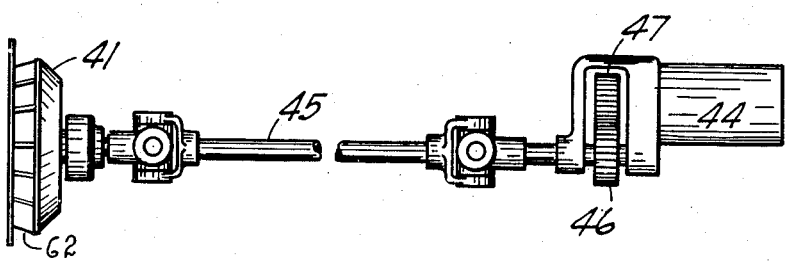
Figure 5 is a fractional plan view of the generator and compressor driving shaft.
Figure 6:
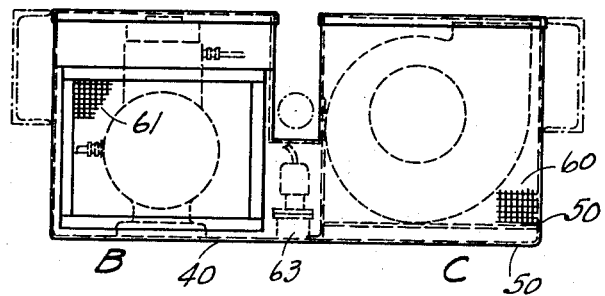
Figure 6 is a fractional rear end view of the parts as shown in Figure 4.
Figure 7:
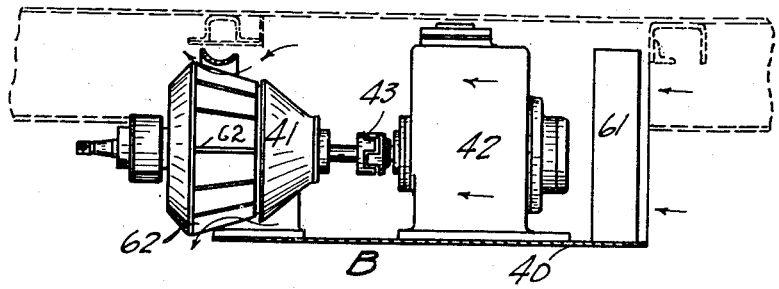
Figure 7 is a side elevation of the evaporator, air compressor and speed controlling device.

The generator 44 may be the regular equipment as is used on ambulances, busses etc. and is geared direct to the engine, and as shown in Figure 5, it is adapted to be gear connected to shaft 45 by means of gears 46 and 47. The shaft 45 may however be directly gear connected to the engine.

Automotive engines necessarily operate at a wide range of speeds. The shaft 45 is directly connected to speed governor 41 as indicated in Figure 5. Excessive compressor speed would be injurious, therefore the speed governor 41 is adapted to regulate the compressor speed to practical limits. I have illustrated an electric dynamic speed regulating device, however I may elect to use a centrifugal governor. Another method I have contemplated is to drive the compressor by means of an electric motor requiring of course a larger generator and battery system.

Figure 4:
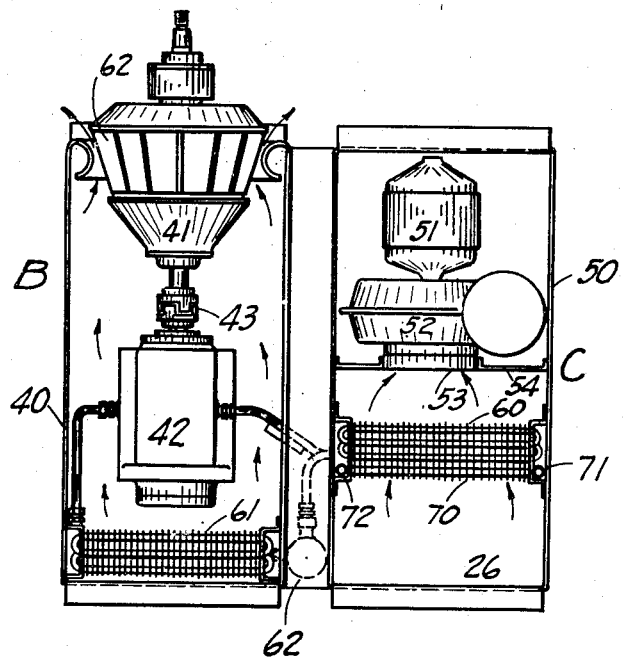
Figure 4 is a top plan view showing the preferred relative position of essential parts of the air conditioner.

The unit C comprises an enclosure 50 and a motor 51 which is adapted to receive its current from the generator 44. The air circulating fan 52 is directly connected to the motor 51. The air enters enclosure 50 as at 26 and will move forward and enter the fan inlet as at 53, as indicated by arrows in Figures 2 and 4, and will be discharged into the vertical air duct 18 as at 54. By referring to Figure 2, it will be observed that air from the grille 29 passes through container 50, through passage ways 30 and meets and mingles with the air from the body enclosure and is discharged by the fan into duct 18.

I will now describe the means by which the air is conditioned. A suitable heat transfer unit or evaporator 60 in the form of what is commonly termed a radiator core is positioned in the enclosure 50 as clearly indicated in Figure 4, whereby all of the air must pass through the core 60. A partition wall 54 is provided having an opening which registers with the inlet 53. A heat transfer unit or condenser 61 is positioned in the rear end of enclosure 40. Fan blades 62 are attached to the wall of unit 41 to thereby circulate fresh air through the enclosure 40 as indicated by arrows in Figure 4.

The liquid coming from the condenser 61 is expanded into the evaporator 60 by means of a thermostatically controlled expansion valve 62 and a thermostatic bulb, and other necessary connections supplied to make up a refrigerator whereby the air is cooled as it passes through the evaporator, in a manner too well known to require further illustration and description.

Figure 8:
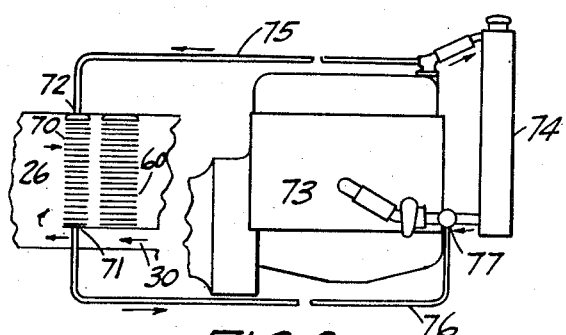
Figure 8 is a diagrammatic view of the engine and manner of connecting a cold weather heater to the engine.

In Figure 8, I show my plan for warming the body enclosure during cold weather by means of the cooling liquid from the engine. I provide a heat transfer core 70, having inlet and outlet connections as at 71 and 72. This core is positioned adjacent the evaporator core 60, whereby all of the circulated air will pass through the core 70. The engine is designated by numeral 73 and the regular radiator equipment by numeral 74, having the usual coolant connections to the engine as illustrated. A suitable pipe connection 75, is made between the engine jacket and core 70, as at 72 and a similar pipe connection 76 is made from the circulating pump 77 to core 70 as at 71. Means may be provided whereby all or a part of the coolant may be forced through the core 70, thus to provide the desired degree of heat to the circulating air. The direction of coolant flow is indicated by arrows. Obviously when this device is in operation the refrigerator is not.

One of the principal objects of positioning the cooling device under the seat is to thereby make the parts easily accessible, and while the device extends a considerable distance below the floor line it is nevertheless easily enclosed and protected against dirt which would otherwise leak through the floor of the vehicle.

It will be seen that I provide a simple means for cooling or warming the circulated air. Means may easily be provided whereby air from the vehicle may be caused to move through the condenser, and the outside air caused to move through the evaporator, thus to warm the vehicle by operating the refrigerator on a reversed cycle instead of cooling it in a manner already described. Many minor changes in details and position of parts may obviously be made without departing from the scope of my invention.

Having thus shown and described my invention I claim:

1. In a passenger automobile of the closed body type comprising a front driver's compartment and a rear passenger compartment with a partition between said compartments and a seat in said driver's compartment adjacent said partition, the combination of an air space adjacent the floor of said body and extending beneath said seat, a passage connecting said air space and passenger space at a level above the floor level of said body and a second passage connecting said spaces including a portion beneath said floor and communicating with said passenger space through an opening in the floor of the latter, mechanical refrigerating apparatus including a cooling device in said air space and air moving means in said air space for drawing air into the latter through the last mentioned passage and returning it to said passenger space through the first mentioned passage.

2. In a passenger automobile of the closed body type comprising a front driver's compartment and a rear passenger compartment with a partition between said compartments and a seat in said driver's compartment adjacent said partition, the combination of an air space adjacent the floor of said body and extending beneath said seat, a passage connecting said air space and passenger space at a level above the floor level of said body and a second passage connecting said spaces located beneath said floor and communicating with said passenger space through an opening in the floor of the latter, mechanical refrigerating apparatus including a cooling device in said air space, air moving means in said air space for drawing air into the latter through the last mentioned passage and returning it to said passenger space through the first mentioned passage, and means for supplying makeup air to the recirculating system including said spaces.

3. In a motor vehicle of the closed body type having an operator's seat in the forward end thereof and an enclosure, the combination of an air conditioning core having a blower fan, a ceiling air duct having a multiplicity of closely spaced outlets, a substantially vertical air passageway positioned adjacent and in rear of said seat and forming an operating connection between said fan and ceiling air duct, said fan and core positioned under said operator's seat and having an air inlet at the rear thereof, whereby air may be discharged into the top of said enclosure and caused to travel forwardly and downwardly to said air inlet.

4. In a vehicle of the closed body type having a space divided by a vertical partition into a body enclosure and a forward operator's compartment having an operator's seat therein positioned adjacent said partition, the combination of an air circulating fan, a ceiling air duct and a vertical air passageway adjacent said vertical partition forming an operating connection from the outlet of said fan to said ceiling air duct, said ceiling air duct having a plurality of outlets, said fan positioned under said operator's seat and having an air inlet in the lower front corner of said body enclosure, whereby air may be discharged into the top of said body enclosure and caused to pass downwardly and forwardly to said air inlet.

5. In a motor vehicle of the closed body type having a space divided by a partition into a body enclosure and a forward operator's compartment, and a driver's seat in said compartment being positioned adjacent said partition, the combination of an air circulating fan, a ceiling air duct having a plurality of spaced openings, a vertical air duct adjacent said partition forming an operating connection between the outlet of said fan and the inlet end of said ceiling air duct, said fan positioned under said seat and having an air inlet in the lower front corner of said body enclosure, whereby air may be circulated through said body enclosure, an opening from said vertical air duct into the top of said operator's compartment, an outside air inlet into said operator's compartment and means whereby the air passing into said compartment will move therefrom and be caused to mingle with the recirculated air before passing into said fan.

6. In a motor vehicle of the closed body type having a space divided by a partition in the forward end thereof into a body enclosure and an operator's compartment having an operator's seat therein positioned adjacent said partition, the combination of an air conditioning and circulating plant positioned under said operator's seat, a ceiling air duct and a vertical air passageway adjacent said partition forming an operating connection between said plant and said ceiling air duct, said ceiling air duct having a plurality of spaced outlets, said plant positioned under said operator's seat and having an air inlet in the lower front corner of said body enclosure, whereby the air may be conditioned and caused to move from said ceiling air duct outlets through said body to said plant inlet.

7. In a motor vehicle of the closed body type having a space divided by a partition in the forward end thereof into a body enclosure and an operator's compartment having an operator's seat therein positioned adjacent said partition, the combination of an engine, a refrigerator plant and means whereby said plant is driven by said engine, said plant positioned under said operator's seat and having a blower fan and an evaporator and means whereby air will be circulated through said body enclosure and cooled by said evaporator.

8. In a vehicle of the closed body type having an operator's seat in the forward end thereof, the combination of an air circulating fan positioned under said seat, a ceiling air duct and a substantially vertical air passageway forming an operating connection between said fan and said ceiling air duct, an air inlet to said fan positioned adjacent and in rear of said seat, said ceiling air duct having a number of spaced apart openings, whereby said fan may cause air to be discharged into the top of the body of the vehicle and moved downwardly and forwardly to said fan inlet.

9. In a motor vehicle of the closed body type having an operator's seat in the forward end thereof, the combination of an air circulating fan positioned under said seat, a ceiling air duct and a substantially vertical air passageway connected thereto having a connection to the outlet of said fan, an inlet to said fan in rear of and adjacent said seat, said ceiling air duct having a number of spaced apart openings, whereby said fan may cause the air to be discharged into the top of and moved downwardly and forwardly through the body of the vehicle to said fan inlet, said vertical air passageway being in rear of and adjacent said seat, and a heat exchange coil positioned in the air passageway adjacent said fan whereby the circulated air is conditioned while passing therethrough.

10. In a motor vehicle of the closed body type having an operator's seat in the forward end thereof, the combination of an air circulating fan positioned under said seat, a ceiling air duct and a substantially vertical air passageway connected thereto and having a connection to the outlet of said fan, an inlet to said fan in rear of and adjacent said seat, said ceiling air duct having a number of spaced apart openings, whereby said fan may cause the circulated air to be discharged into the top of and moved downwardly and forwardly through said body to said fan inlet, said vertical air passageway being positioned in rear of and adjacent said seat, a heat exchanger coil positioned in the air passageway adjacent said fan whereby the circulated air is conditioned, and means whereby a predetermined quantity of outside air may pass into said body in front of said operator's seat and then be caused to pass into the inlet of said fan.

FRED M. YOUNG.